(12) United States Patent
Suman (10) Patent No.: US 10,339,350 B2
(45) Date of Patent: Jul. 2, 2019

(54) SUBDIVIDED BARCODE READER EXIT WINDOW

(71) Applicant: Datalogic IP Tech S.r.l., Calderara di Reno (IT)

(72) Inventor: Michele Suman, Ponte San Nicolò (IT)

(73) Assignee: DATALOGIC IP TECH S.R.L., Lippo di Calderara (IT)

( * ) Notice: Subject to any disclaimer, the term of this patent is extended or adjusted under 35 U.S.C. 154(b) by 0 days.

(21) Appl. No.: 15/368,058

(22) Filed: Dec. 2, 2016

(65) Prior Publication Data

US 2017/0161532 A1 Jun. 8, 2017

Related U.S. Application Data

(60) Provisional application No. 62/262,078, filed on Dec. 2, 2015.

(51) Int. Cl.
*G06K 7/10* (2006.01)
*G06K 19/06* (2006.01)
*G06K 7/14* (2006.01)

(52) U.S. Cl.
CPC ........ *G06K 7/10811* (2013.01); *G06K 7/1096* (2013.01); *G06K 7/10732* (2013.01); *G06K 7/10881* (2013.01); *G06K 7/1413* (2013.01); *G06K 19/06028* (2013.01)

(58) Field of Classification Search
CPC .............................................. G06K 7/10–1098
See application file for complete search history.

(56) References Cited

U.S. PATENT DOCUMENTS

| | | | |
|---|---|---|---|
| 6,223,986 B1 * | 5/2001 | Bobba ................ | G06K 7/10683 235/462.2 |
| 6,347,163 B2 | 2/2002 | Roustaei | |
| 6,830,189 B2 | 12/2004 | Tsikos et al. | |
| 7,152,797 B1 * | 12/2006 | Danielson .......... | G06K 7/10633 235/462.06 |
| 7,350,711 B2 | 4/2008 | He et al. | |
| 8,004,600 B2 * | 8/2011 | Hsia ................... | G06K 7/10544 235/462.42 |
| 8,033,471 B2 | 10/2011 | Van Kerkhoven et al. | |
| 8,087,587 B2 * | 1/2012 | Vinogradov ....... | G06K 7/10722 235/462.21 |

(Continued)

OTHER PUBLICATIONS

Chernenko, Sergey, Article 11 of Function Handbook, 2007-2018, 4 pages. Available at: http://www.librow.com/articles/article-11.

(Continued)

*Primary Examiner* — Christle I Marshall
(74) *Attorney, Agent, or Firm* — Shook, Hardy & Bacon, L.L.P.

(57) ABSTRACT

A barcode scanner incorporates a subdivided exit window with a top portion and a bottom portion placed at different positions along a z-axis. An aiming source emits light from the top portion of the exit window and is positioned from a receiving sensor such that obstruction of the receiving sensor's field of view by the aiming source is avoided. An illumination source emits light from the bottom portion of the exit window and the receiving sensor received reflected light at the bottom portion of the exit window. The illumination source is positioned such that light from the illumination source reflected by the exit window is not received by the receiving sensor.

20 Claims, 4 Drawing Sheets

(56) References Cited

U.S. PATENT DOCUMENTS

| | | | |
|---|---|---|---|
| 8,534,556 B2* | 9/2013 | Drzymala | G06K 7/10732 |
| | | | 235/454 |
| 8,803,967 B2 | 8/2014 | Oggier et al. | |
| 2003/0201329 A1* | 10/2003 | Kumagai | G06K 7/10594 |
| | | | 235/462.32 |
| 2005/0224583 A1* | 10/2005 | Tamburrini | G06K 7/10693 |
| | | | 235/472.01 |
| 2008/0142597 A1* | 6/2008 | Joseph | G06K 7/10722 |
| | | | 235/462.21 |
| 2010/0065642 A1* | 3/2010 | An | G06K 7/10881 |
| | | | 235/462.43 |

OTHER PUBLICATIONS

Discussion of Trigonometry Function Aug. 7, 2012, 1 page.
Hazewinkel, Michiel, ed. (2001) [1994], "Trigonometric functions", Encyclopedia of Mathematics, Springer Science +Business Media B.V. / Kluwer Academic Publishers, ISBN 978-1-55608-010-4.

* cited by examiner

SUBDIVIDED BARCODE READER EXIT WINDOW

CROSS-REFERENCE TO RELATED APPLICATIONS

This application claims the benefit of U.S. Application No. 62/262,078, filed Dec. 2, 2015, entitled "Subdivided Barcode Reader Exit Window," which is incorporated in its entirety by reference herein.

TECHNICAL FIELD

The present invention relates to a barcode scanner. The present invention offers several practical applications in the technical arts, not limited to a barcode scanner. More particularly, the present invention is related to a barcode scanner with a subdivided exit window where the subdivided portions of the exit window are placed at different positions.

BACKGROUND

Figure 1:
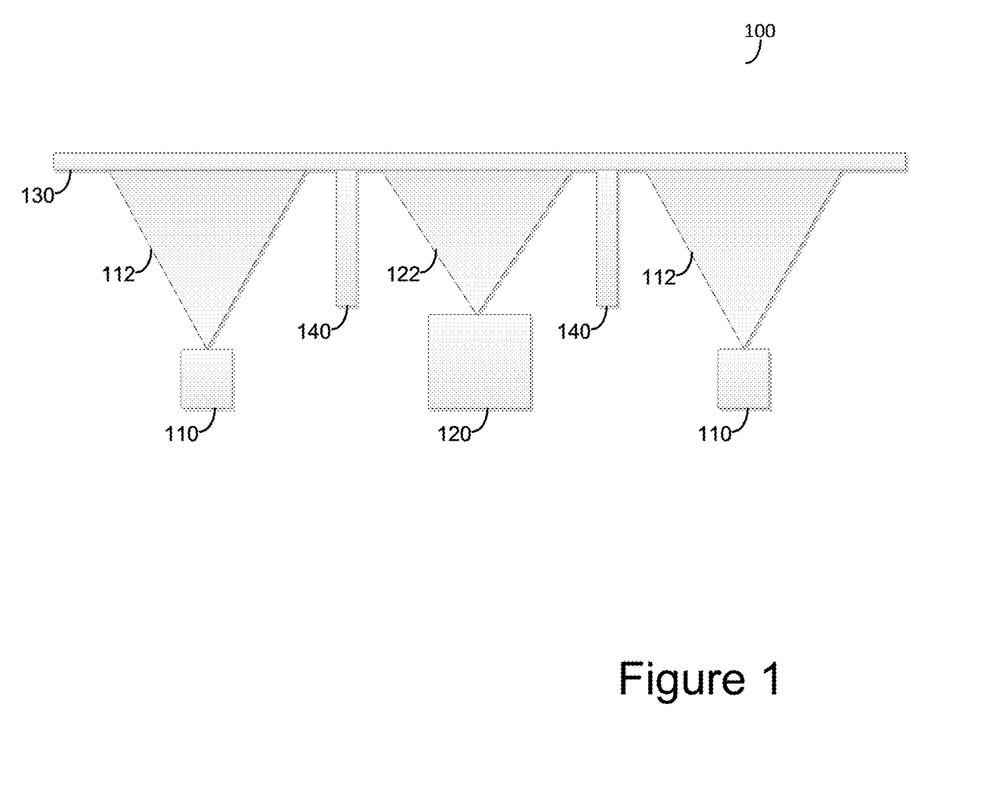
FIG. 1 is a diagram of a conventional barcode scanner.

Conventionally, barcodes are used to represent machine-readable data that corresponds to a product or other information identifiable by the barcode. Barcodes are typically represented as a series of lines of varying width, with the spacing between lines also varying. Barcode scanners are used to read said barcodes. A barcode scanner typically uses an illumination source to illuminate a barcode and a receiving sensor to detect the light from the illumination source reflected from the barcode. A barcode scanner houses the illumination source and receiving sensor, and in some cases an aiming source. As shown in FIG. 1, the illumination source and receiving sensor are typically arranged to allow light from the illumination source to reflect off of a barcode and be received by the receiving sensor. A barcode scanner must be large enough to house the various components (i.e., the illumination source, receiving sensor, and aiming source) as well as to prevent issues such as hot spot reflection (e.g., the light of the illumination source reflecting off the exit window of the barcode scanner and being received by the receiving sensor). However, a large barcode scanner can be unwieldy. A reduction in the size of a barcode scanner while preventing issues associated with a reduction in size would substantially benefit the usability of a barcode scanner.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The present invention generally relates to a barcode scanner that comprises a subdivided exit window, where the subdivided portions of the exit window are placed at different positions, allowing for the barcode scanner to be reduced in size.

In a first aspect, a barcode scanner is provided that includes an aiming source, an illumination source, and a receiving sensor. The aiming source is placed behind a first portion of a subdivided exit window. The receiving sensor is positioned behind a second portion of the subdivided exit window, the positioning of the aiming source and the first portion of the exit window with respect to the receiving sensor and the second portion of the exit window being such to avoid obstruction of the field of view of the receiving sensor by the aiming source. The illumination source is also positioned behind the second portion of the subdivided exit window. The positioning of the illuminating source with respect to the receiving sensor is such that light from the illumination source reflected from the exit window is not substantially received by the receiving sensor.

Additional objects, advantages, and novel features of the invention will be set forth in part in the description which follows, and in part will become apparent to those skilled in the art upon examination of the following, or may be learned by practice of the invention.

BRIEF DESCRIPTION OF THE SEVERAL VIEWS OF THE DRAWING

The present invention is described in detail below with reference to the attached drawing figures, wherein.

DETAILED DESCRIPTION

The subject matter of the embodiments of the invention is described with specificity herein to meet statutory requirements. However, the description itself is not intended to limit the scope of this patent. Rather, the inventors have contemplated that the claimed subject matter also might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

In a first aspect, a barcode scanner is provided that includes an aiming source, an illumination source, a receiving sensor, and a subdivided exit window (shown as a first portion and a second portion). The aiming source emits light through the first portion. The illumination source emits light and the receiving sensor receives reflected light through the second portion. The aiming source is positioned at a different z-axis from the illumination source and receiving sensor.

In FIG. 1, a conventional barcode scanner 100 is shown. The convention barcode scanner comprises illumination sources 110, a receiving sensor 120, an exit window 130, and plastic walls 140. As shown in FIG. 1, the illumination sources 110 and receiving sensor 120 are typically arranged to allow light from the illumination sources 110 to reflect off of a barcode, and light 122 reflected from the barcode is received by the receiving sensor 120. Conventional barcode scanners typically do not have anti-reflection coating on the exit window 130 to reduce cost. Furthermore, in order to reduce the cost of the barcode scanners, conventional barcode scanners use placement of the illumination sources 110 with respect to the receiving sensor 120, and plastic walls 140 placed between the illumination sources 110 and receiving sensor 120, to avoid, for example, hot spot reflections (i.e., reflection of light from the illumination sources 110 that bounces off the exit window 130) from affecting the receiving sensor's performance. Thus, in order to reduce cost, the size of the barcode scanner, and in particular, the exit window, must be increased.

Figure 2:
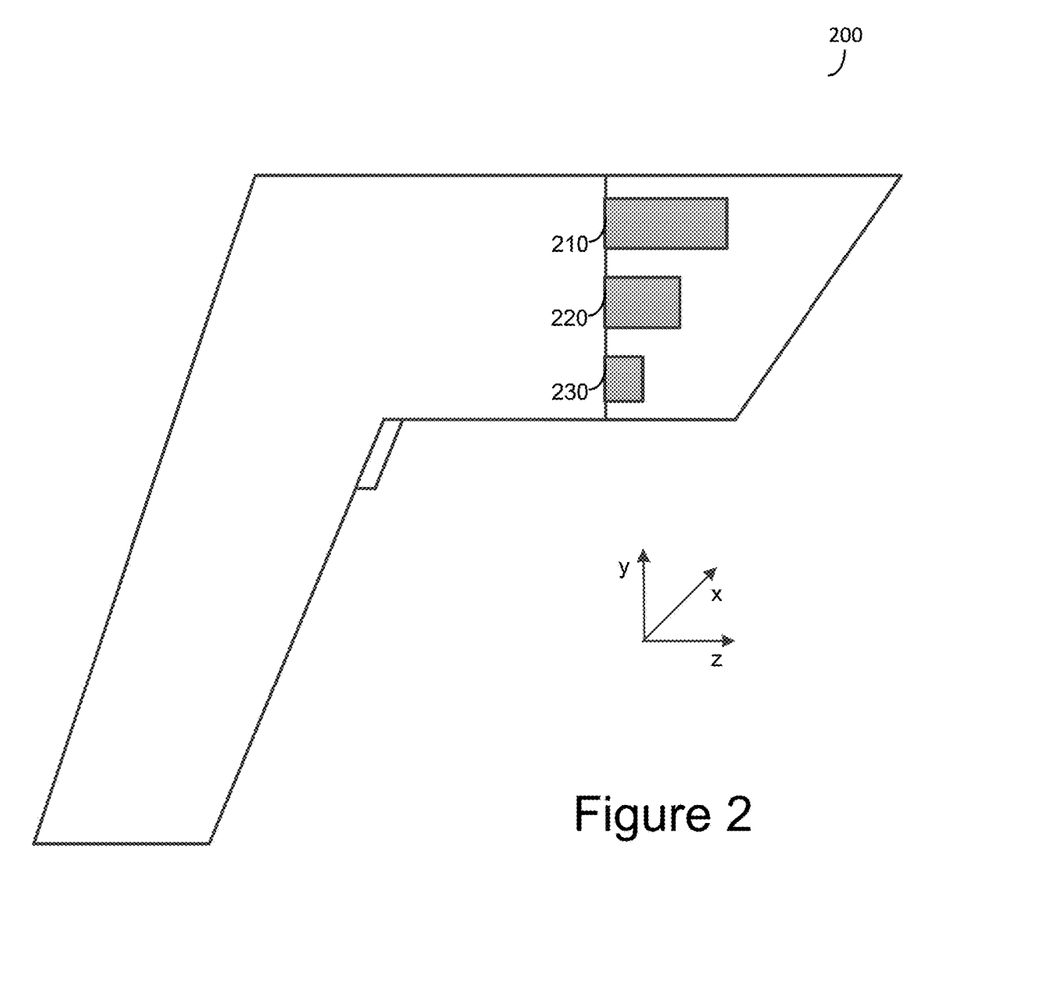
FIG. 2 is a diagram of an exemplary barcode scanner.

In FIG. 2, an exemplary barcode scanner 200 is shown. The barcode scanner includes an aiming source 210, an illumination source 220, and a receiving sensor 230.

The aiming source 210 comprises a light emitting diode (LED) and a lens placed in front of the LED. Although an LED is described, it should be understood that the aiming source 210 can comprise any kind of light source. For example, the aiming source 210 can comprise a laser. The aiming source 210 illuminates a barcode to guide a user of the barcode scanner to place the barcode scanner in a position to read the barcode. The light from the aiming source 210 can be a directional light, where the light path of the aiming source 210 has the same or similar diameter as the aiming source.

The illumination source 220 comprises one or more LEDs. Although an LED is described, it should be understood that the illumination source 220 can comprise any kind of light source. For example, the illumination source 220 can comprise a laser. It should also be understood that the illumination source 220 can comprise any number of LEDs, i.e., more than one. The illumination source 220 illuminates a barcode in proximity to an object. The light path of the illumination source 220 expands outward from the light emitting portion of the illumination source 220.

The receiving sensor 230 is operable to receive the reflected light from the barcode. The receiving sensor may comprise a plurality of light sensors arranged in a uniform configuration. Each of the light sensors detects the light intensity directly in front of the sensor. When the illumination source reflects a barcode, light of differing intensity is reflected from the barcode and read by the receiving sensor 230. The sensor path of the receiving sensor 230 expands outward from the receiving portion of the receiving sensor 230.

Improvements in image sensor technology have enabled the size of pixels of image sensors to decrease. This enables the size of the receiving optics of the receiving sensor 230 to be comparable to or less than the size of the optics of the aiming source 210 and illumination source 220. In some embodiment, the size of the aiming source 210 is larger than the illumination source 220 and receiving sensor 230. Barcode scanners generally have the shape where a top portion of the housing extends from the barcode scanner further than the bottom portion. Thus, the aiming source 210 may be placed in the housing of the barcode scanner 200 nearer the top portion of the barcode scanner 200 extending further than the bottom portion of the barcode scanner 200.

Figure 3:
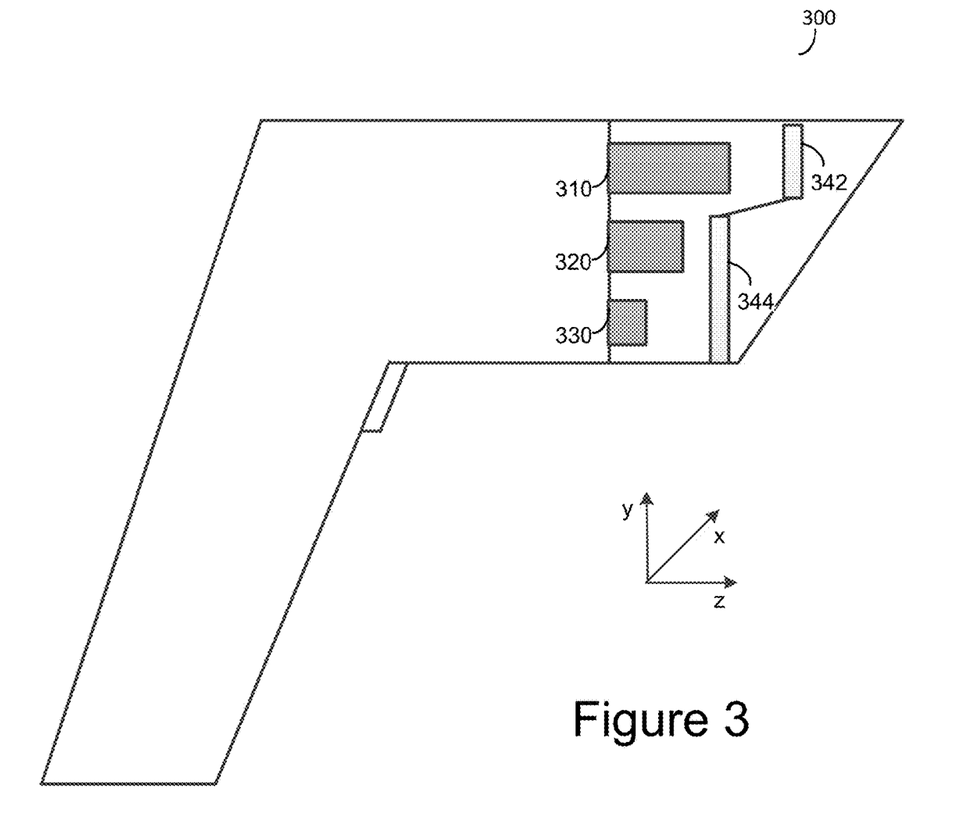
FIG. 3 is another diagram of an exemplary barcode scanner with a subdivided exit window.

Continuing with FIG. 3, a barcode scanner 300 with a subdivided exit window (342 and 344) is shown. The barcode scanner includes an aiming source 310, an illumination source 320, a receiving sensor 330, and an exit window subdivided into a first portion 342 and a second portion 344.

Generally, the receiving sensor 330 is placed in a central position of the barcode scanner along the x-y axis. The receiving sensor 330 is placed along the x-axis and y-axis to optimize the coverage area of the sensor. Although the receiving sensor 330 is described as being placed in a central position, it should be understood that the receiving sensor 330 can be placed in other positions within the barcode scanner.

The illumination source 320 is placed proximate to the receiving sensor 330. The placement of the illumination source 320 is affected by two factors: (1) the illumination source 320 must be placed close to the receiving sensor 330 for the receiving sensor 330 to receive the reflected light off the barcode, but (2) must be far enough away from the receiving sensor 330 so that the receiving sensor 330 is not affected by exit window hot spot reflections or other reflections not reflected from a barcode. This distance can be expressed by the formula:

$$d_{opt \to ill} = tg(\alpha_{FOV}/2) * (z_{PCB \to wnd1} - z_{ill}) + tg(\alpha_{FOV}/2) * (z_{PCT \to wnd1} - z_{opt})$$

where $d_{opt \to ill}$ is the distance between the illumination source 320 and the receiving sensor 330. $z_{PCB \to wnd1}$ is the distance in the z-axis between the printed circuit board (PCB) (not shown) and the second portion 344 of the exit window, $z_{ill}$ is the distance in the z-axis between the PCB and the illuminating end of the illumination source 320, $z_{opt}$ is the distance in the z-axis between the PCB and the receiving end of the receiving sensor 330, and $\alpha_{FOV}$ is the angle of the receiving sensor field of view. One of ordinary skill understands that the symbol tg stands for the trigonometric tangent function.

Since $z_{PCB \to wnd1} > z_{opt} \geq z_{ill}$ must be true for the second portion 344 of the exit window to cover the receiving sensor 330 and the illumination source 320, the minimum distance between the illumination source 320 and the receiving sensor 330 can be expressed by the formula:

$$d_{opt \to ill}(minimum) = tg(\alpha_{FOV}/2) * (z_{opt} - z_{ill}) + tg(\alpha_{FOV}/2) * (z_{opt} - z_{opt}) = tg(\alpha_{FOV}/2) * (z_{opt} - z_{ill})$$

The aiming source 310 is placed proximate to the receiving sensor 330 and uses the first portion 342 of the exit window. The placement of the aiming source 310 is affected by the obstruction of the field of view (FOV) of the receiving sensor 330 by the aiming source 310. Thus, the distance between the aiming source 310 and the receiving sensor 330 can be expressed by the formula:

$$d_{opt \to aim} = tg(\alpha_{FOV}/2) * (z_{PCB \to wnd2} - z_{opt})$$

where $d_{opt \to aim}$ is the distance between the aiming source 310 and the receiving sensor 330. $z_{PCB \to wnd2}$ is the distance in the z-axis between the PCB (not shown) and the first portion 342 of the exit window, and $z_{opt}$ is the distance in the z-axis between the PCB and the receiving end of the receiving sensor 330.

Since $z_{PCB \to wnd2} > z_{aim} > z_{ill}$ must be true for the window to cover the aiming source 310, the minimum distance between the aiming source 310 and the receiving sensor 330 can be expressed by the formula:

$$d_{opt \to aim}(minimum) = tg(\alpha_{FOV}/2) * (z_{aim} - z_{opt})$$

where $d_{opt \to aim}$ is the distance between the aiming source 310 and the receiving sensor 330. $z_{PCB \to wnd2}$ is the distance in the z-axis between the PCB (not shown) and the first portion 342 of the exit window, and $z_{opt}$ is the distance in the z-axis between the PCB and the receiving end of the receiving sensor 330.

The placement of the illumination source 320 and aiming source 310 with respect to the receiving sensor 330 using a non-subdivided exit window can be expressed by the respective formulas:

$$d_{opt \to aim}(minimum) = tg(\alpha_{FOV}/2) * (z_{PCB \to wnd} - z_{opt}) = tg(\alpha_{FOV}/2) * (z_{aim} - z_{opt})$$

$$d_{opt \rightarrow ill} = tg(\alpha_{FOV}/2)*(z_{PCB \rightarrow wnd} - z_{ill}) + tg(\alpha_{FOV}/2)*$$
$$(z_{PCB \rightarrow wnd} - z_{opt}) = tg(\alpha_{FOV}/2)*[(z_{aim} - z_{ill}) + (z_{aim} - z_{opt})]$$

A comparison of the distances for $d_{opt \rightarrow ill}$ using a sub-segmented exit window and a single exit window were performed. The results of the comparison are shown in the below table:

| $z_{ill}$ (mm) | $z_{aim}$ (mm) | $z_{opt}$ (mm) | $\alpha_{FOV}$ (*) | $d_{opt \rightarrow ill}$ (mm) two segment window | $d_{opt \rightarrow ill}$ (mm) single exit window |
|---|---|---|---|---|---|
| 3.5 | 30 | 10 | 25 | 1.44 | 10.3088 |
| 3.5 | 21 | 10 | 25 | 1.44 | 6.3183 |
| 3.5 | 12 | 10 | 25 | 1.44 | 2.3278 |
| 3.5 | 30 | 10 | 30 | 1.74 | 12.4596 |
| 3.5 | 21 | 10 | 30 | 1.74 | 7.6366 |
| 3.5 | 12 | 10 | 30 | 1.74 | 2.8135 |
| 3.5 | 30 | 10 | 40 | 2.4 | 16.9246 |
| 3.5 | 21 | 10 | 40 | 2.4 | 10.3732 |
| 3.5 | 12 | 10 | 40 | 2.4 | 3.8217 |
| 3.5 | 30 | 10 | 50 | 3 | 21.6833 |
| 3.5 | 21 | 10 | 50 | 3 | 13.2898 |
| 3.5 | 12 | 10 | 50 | 3 | 4.8962 |
| 3.5 | 30 | 7 | 25 | 0.78 | 10.9739 |
| 3.5 | 21 | 7 | 25 | 0.78 | 6.9834 |
| 3.5 | 12 | 7 | 25 | 0.78 | 2.9929 |
| 3.5 | 30 | 7 | 30 | 0.94 | 13.2635 |
| 3.5 | 21 | 7 | 30 | 0.94 | 8.4404 |
| 3.5 | 12 | 7 | 30 | 0.94 | 3.6173 |
| 3.5 | 30 | 7 | 40 | 1.3 | 18.0165 |
| 3.5 | 21 | 7 | 40 | 1.3 | 11.4651 |
| 3.5 | 12 | 7 | 40 | 1.3 | 4.9136 |
| 3.5 | 30 | 7 | 50 | 1.6 | 23.0822 |
| 3.5 | 21 | 7 | 50 | 1.6 | 14.6887 |
| 3.5 | 12 | 7 | 50 | 1.6 | 6.2952 |
| 3.5 | 30 | 3 | 25 | 0.1 | 11.6390 |
| 3.5 | 21 | 3 | 25 | 0.1 | 7.6485 |
| 3.5 | 12 | 3 | 25 | 0.1 | 3.6580 |
| 3.5 | 30 | 3 | 30 | 0.13 | 14.0673 |
| 3.5 | 21 | 3 | 30 | 0.13 | 9.2442 |
| 3.5 | 12 | 3 | 30 | 0.13 | 4.4212 |
| 3.5 | 30 | 3 | 40 | 0.18 | 19.1084 |
| 3.5 | 21 | 3 | 40 | 0.18 | 12.5570 |
| 3.5 | 12 | 3 | 40 | 0.18 | 6.0055 |
| 3.5 | 30 | 3 | 50 | 0.23 | 24.4812 |
| 3.5 | 21 | 3 | 50 | 0.23 | 16.0876 |
| 3.5 | 12 | 3 | 50 | 0.23 | 7.6941 |

Figure 4:
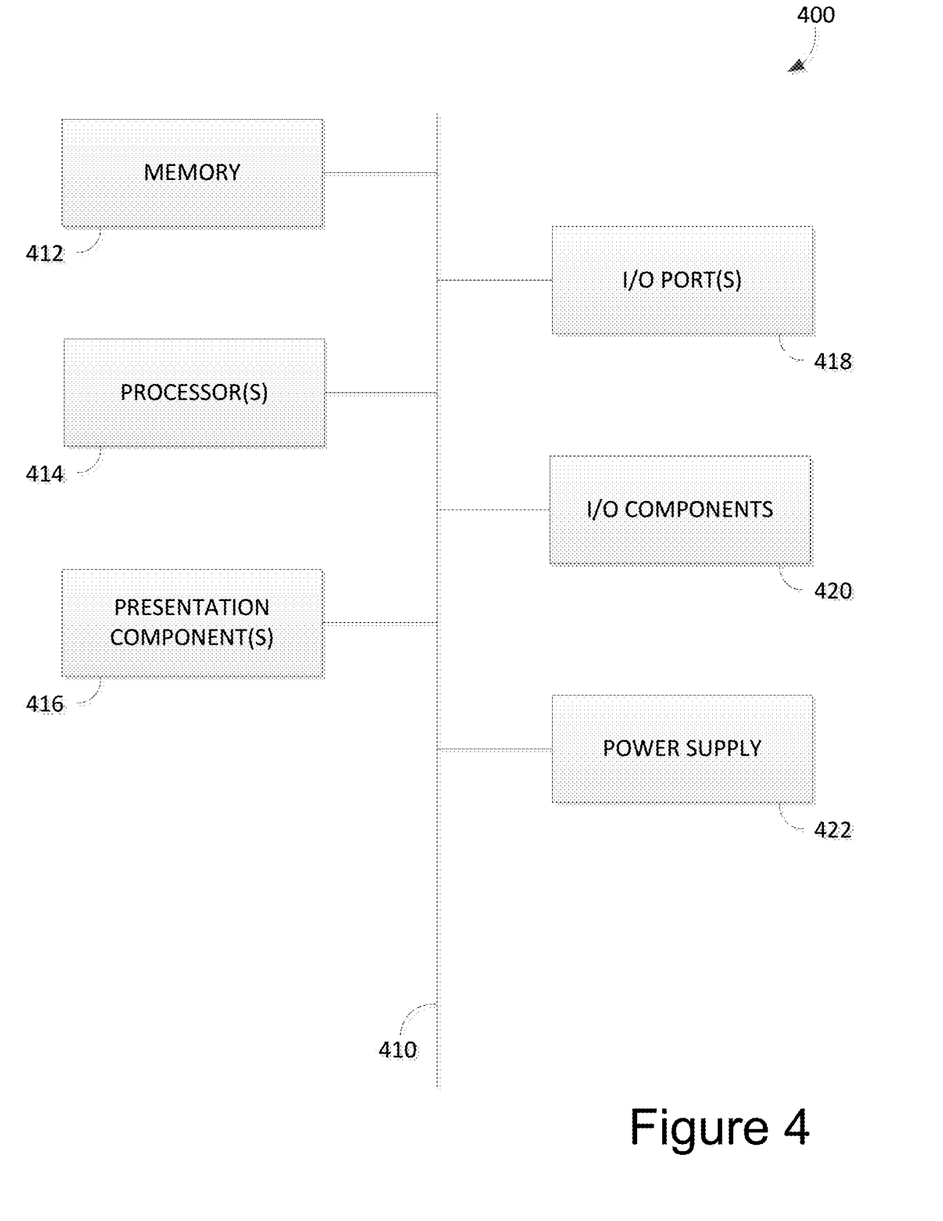
FIG. 4 is a block diagram of an exemplary computing device suitable for use in implementing embodiments of the present invention.

Having described embodiments of the present invention, an exemplary operating environment in which embodiments of the present invention may be implemented is described below in order to provide a general context for various aspects of the present invention. Referring initially to FIG. 4 in particular, an exemplary operating environment for implementing embodiments of the present invention is shown and designated generally as computing device 400. Computing device 400 is but one example of a suitable computing environment and is not intended to suggest any limitation as to the scope of use or functionality of the invention. Neither should the computing device 400 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 4, computing device 400 includes a bus 410 that directly or indirectly couples the following devices: memory 412, one or more processors 414, one or more presentation components 416, input/output ports 418, input/output components 420, and an illustrative power supply 422. Bus 410 represents what may be one or more busses (such as an address bus, data bus, or combination thereof). Although the various blocks of FIG. 4 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 4 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 4 and reference to "computing device."

Computing device 400 typically includes a variety of computer-readable media. Computer-readable media can be any available media that can be accessed by computing device 400 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 400. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 412 includes computer storage media in the form of volatile and/or nonvolatile memory. The memory may be removable, non-removable, or a combination thereof. Exemplary hardware devices include solid-state memory, hard drives, optical-disc drives, etc. Computing device 400 includes one or more processors that read data from various entities such as memory 412 or I/O components 420. Presentation component(s) 416 present data indications to a user or other device. Exemplary presentation components include a display device, speaker, printing component, vibrating component, etc.

I/O ports 418 allow computing device 400 to be logically coupled to other devices including I/O components 420, some of which may be built in. Illustrative components include a microphone, joystick, game pad, satellite dish, scanner, printer, wireless device, etc.

Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

From the foregoing, it will be seen that this invention is one well adapted to attain all the ends and objects hereinabove set forth together with other advantages which are obvious and which are inherent to the structure.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A barcode scanner system, comprising:
   an aiming source operable to emit a first light to indicate a location of a barcode;
   an illumination source operable to emit a second light to reflect off of the barcode;
   a receiving sensor positioned next to the aiming source and the illumination source on a substrate to receive the reflected second light from the barcode;
   an exit window divided into a first portion and a second portion;
   the first portion of the exit window positioned in front of the aiming source for emitting the first light from the aiming source;
   and the second portion of the exit window positioned in front of the illumination source and receiving sensor for emitting the second light from the illumination source and receiving the reflected second light from the illumination source reflected from the barcode at the receiving sensor,
   wherein the first portion of the exit window being positioned at a first planar position having a first distance from the substrate different from the second portion of the exit window positioned at a second planar position having a second distance from the substrate.

2. The system of claim 1, wherein the illumination source and the receiving sensor are positioned at a distance from each other to minimize light from the illumination source reflected by the exit window from being read by the receiving sensor.

3. The system of claim 2, wherein a distance between the illumination source and the receiving sensor is expressed by an equation:

$$d_{opt \to ill}(\text{minimum}) = tg(\alpha_{FOV}/2) * (z_{opt} - z_{ill}),$$

where $z_{opt}$ is the position of a receiving end of the receiving sensor along the z-axis and $Z_{ill}$ is the position of an illumination end of the illumination source along a z-axis.

4. The system of claim 1, wherein the aiming source and the receiving sensor are positioned at a distance from each other to avoid obstruction of a field of view of the receiving sensor by the aiming source.

5. The system of claim 1, wherein a distance between the aiming source and the receiving sensor is expressed by an equation:

$$d_{opt \to aim} = tg(\alpha_{FOV}/2) * (z_{aim} - z_{opt}),$$

where $z_{opt}$ is a position of a receiving end of the receiving sensor along a z-axis and $Z_{aim}$ is the position of an illumination end of the aiming source along the z-axis.

6. The system of claim 1, wherein the illumination source comprises two or more light emitting diodes (LED) having a collimating lens positioned in front of the LEDs.

7. A method, comprising:
   operating a barcode scanner to read a barcode;
   emitting a first light in the barcode scanner by an aiming source through a first portion of a divided exit window of the barcode scanner, the first light guiding a user to place the barcode scanner in a position to read of the barcode;
   emitting a second light in the barcode scanner by an illumination source through a second portion of the divided exit window of the barcode scanner, the second light reflecting off of the barcode,
   and receiving the reflected second light from the barcode by a receiving sensor positioned next to the aiming source and illumination source on a substrate;
   wherein the first portion of the exit window being positioned at a first planar position having a first distance from the substrate different from the second portion of the exit window positioned at a second planar position having a second distance from them substrate.

8. The method of claim 7, wherein the reflected second light is received by a receiving sensor, wherein the receiving sensor receives the reflected second light via the second portion.

9. The method of claim 7, wherein the illumination source and the receiving sensor are positioned at a distance from each other to minimize light from the illumination source reflected by the exit window from being read by the receiving sensor.

10. The method of claim 7, wherein a distance between the illumination source and the receiving sensor is expressed by an equation:

$$d_{opt \to ill}(\text{minimum}) = tg(\alpha_{FOV}/2) * (z_{opt} - z_{ill}),$$

where $z_{opt}$ is the position of a receiving end of the receiving sensor along the z-axis and $Z_{ill}$ is the position of an illumination end of the illumination source along a z-axis.

11. The method of claim 7, wherein the aiming source and the receiving sensor are positioned at a distance from each other to avoid obstruction of a field of view of the receiving sensor by the aiming source.

12. The method of claim 7, wherein a distance between the aiming source and the receiving sensor is expressed by an equation:

$$d_{opt \to aim} = tg(\alpha_{FOV}/2) * (z_{aim} - z_{opt}),$$

where $z_{opt}$ is a position of a receiving end of the receiving sensor along a z-axis and $Z_{aim}$ is the position of an illumination end of the aiming source along the z-axis.

13. The method of claim 7, wherein the illumination source comprises two or more light emitting diodes (LED) having a collimating lens positioned in front of the LEDs.

14. A computer readable media having instructions for a method causing a processor to scan a barcode by a barcode scanner operated by a user, the method comprising:

emitting a first light in the barcode scanner by an aiming source through a first portion of a divided exit window in the barcode scanner, the first light indicating a location of a barcode;

emitting a second light in the barcode scanner by an illumination source through a second portion of the divided exit window in the barcode scanner, the second light reflecting off of the barcode, and receiving the reflected second light from the barcode by a receiving sensor positioned next to the aiming source and illumination source on a substrate, wherein the first portion being positioned at a first planar position different from the second portion positioned at a second planar position;

wherein the first portion of the exit window being positioned at a first planar position having a first distance from the substrate different from the second portion of the exit window positioned at a second planar position having a second distance from the substrate.

15. The media of claim 14, wherein the reflected second light is received by a receiving sensor, the receiving sensor being positioned next to the aiming source and the illumination source, and wherein the receiving sensor receives the reflected second light via the second portion.

16. The media of claim 14, wherein the illumination source and the receiving sensor are positioned at a distance from each other to minimize light from the illumination source reflected by the exit window from being read by the receiving sensor.

17. The media of claim 14, wherein the aiming source and the receiving sensor are positioned at a distance from each other to avoid obstruction of a field of view of the receiving sensor by the aiming source.

18. The media of claim 14, wherein a size of the receiving sensor is less than a size of the aiming source and illumination source.

19. The media of claim 14, wherein the receiving sensor is placed in a central position of the barcode scanner along an x-y axis.

20. The media of claim 14, wherein a minimum distance between the illumination source and the receiving sensor is expressed by an equation:

$$d_{opt \to ill}(\text{minimum}) = tg(\alpha_{FOV}/2) * (z_{opt} - z_{ill}) + tg(\alpha_{FOV}/2) * (z_{opt} - z_{opt}) = tg(\alpha_{FOV}/2) * (z_{opt} - z_{ill})$$

where $z_{opt}$ is the position of a receiving end of the receiving sensor along the z-axis and $Z_{ill}$ is the position of an illumination end of the illumination source along a z-axis.

* * * * *